United States Patent
Szumer

(10) Patent No.: US 6,209,211 B1
(45) Date of Patent: Apr. 3, 2001

(54) SPIRIT LEVEL WITH MULTIPLE BUBBLE VIALS

(75) Inventor: Emanuel Szumer, Kibbutz Kadarim (IL)

(73) Assignee: Kapro Industries Ltd., Beit Hakerman (IL)

(*) Notice: Subject to any disclaimer, the term of this patent is extended or adjusted under 35 U.S.C. 154(b) by 0 days.

(21) Appl. No.: 09/261,841

(22) Filed: Mar. 3, 1999

(30) Foreign Application Priority Data

Mar. 6, 1998 (IL) .......................................... 123587

(51) Int. Cl.[7] .................................................. G01C 9/24
(52) U.S. Cl. .................................................... 33/382
(58) Field of Search ........................... 33/451, 379, 380, 33/381, 382, 383, 384, 385, 386, 387, 388, 389, 390

(56) References Cited

U.S. PATENT DOCUMENTS

| | | | |
|---|---|---|---|
| 73,670 | * 1/1868 | Tate | 33/390 |
| 75,534 | * 3/1868 | Davis | 33/390 |
| 250,777 | * 12/1881 | Bergh | 33/390 |
| 359,580 | * 3/1887 | Thatcher | 33/390 |
| 1,093,775 | * 4/1914 | Frantz | 33/390 |
| 1,126,548 | * 1/1915 | Mayes | 33/390 |
| 1,215,035 | * 2/1917 | Kocisko | 22/390 |
| 1,498,158 | * 6/1924 | Eden | 33/390 |
| 1,630,174 | * 5/1927 | Elsas | 33/390 |
| 1,657,546 | * 1/1928 | Patton | 33/390 |
| 1,802,131 | * 4/1931 | Wright | 33/390 |
| 1,829,257 | * 10/1931 | Best et al. | 33/390 |
| 2,506,115 | * 5/1950 | Stahlin | 33/390 |
| 2,541,880 | * 2/1951 | McMillian et al. | 33/390 |
| 2,692,440 | * 10/1954 | Walters | 33/390 |
| 2,825,144 | * 3/1958 | Warden, Sr. et al. | 33/390 |
| 3,524,259 | 8/1970 | Handley | 33/89 |
| 4,073,062 | * 2/1978 | Wright | 33/388 |
| 4,481,720 | * 11/1984 | Sury | 33/451 |
| 4,531,301 | 7/1985 | Tau | 33/382 |
| 4,545,129 | 10/1985 | Stone | 33/390 |
| 4,947,556 | 8/1990 | Peil | 33/370 |
| 4,979,310 | 12/1990 | Wright | 33/379 |
| 4,991,301 | 2/1991 | Hore | 33/366 |
| 5,208,990 | 5/1993 | Woerlein | 33/354 |
| 5,239,761 | 8/1993 | Wu et al. | 33/451 |
| 5,279,041 | 1/1994 | Wright | 33/379 |
| 5,406,714 | 4/1995 | Baker et al. | 33/382 |
| 5,509,210 | 4/1996 | Murphy | 33/382 |
| 5,519,942 | * 5/1996 | Webb | 33/290 |
| 5,685,083 | 11/1997 | Decesare | 33/390 |
| 5,749,152 | 5/1998 | Goss et al. | 33/381 |
| 5,755,037 | 5/1998 | Stevens | 33/382 |
| 5,784,794 | 7/1998 | Nelson | 33/366 |

OTHER PUBLICATIONS

"Spirit Level", Modern Plastics, pp. 122–123, 1945.

* cited by examiner

Primary Examiner—Randy W. Gibson
(74) Attorney, Agent, or Firm—Ladas & Parry

(57) ABSTRACT

A spirit level including a body having a level face for setting a surface, and a plurality of bubble vials each mounted in a bubble vial housing, the bubble vial housings being mounted in the body, each the bubble vial having a longitudinal axis, called a vial axis, and each the bubble vial housing having a longitudinal axis, called a housing axis, wherein an angular orientation of the vial axis of one the bubble vials with respect to the level face is different than an angular orientation of the vial axis of another the bubble vial with respect to the level face, the difference in angular orientation being in the range of 0°–30°. Other possible ranges include 0°–20°, 0°–10°, 0°–5°, 0°–3°, 0°–2°, or 0°–1°, for example.

15 Claims, 1 Drawing Sheet

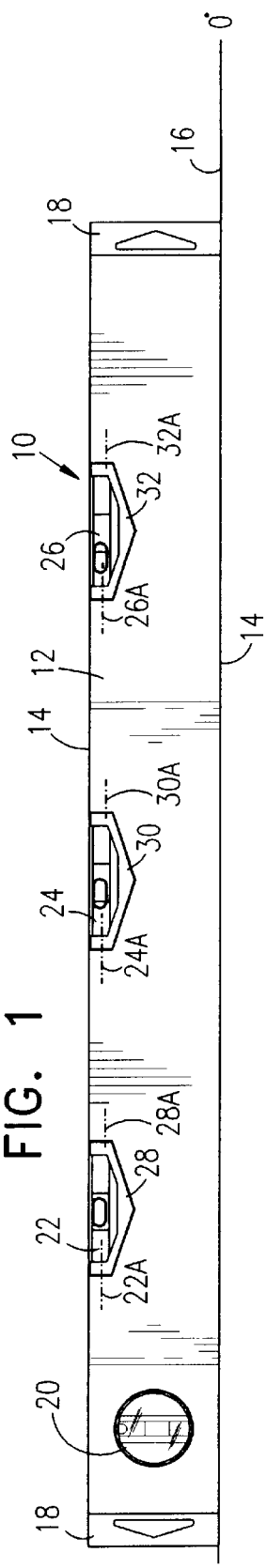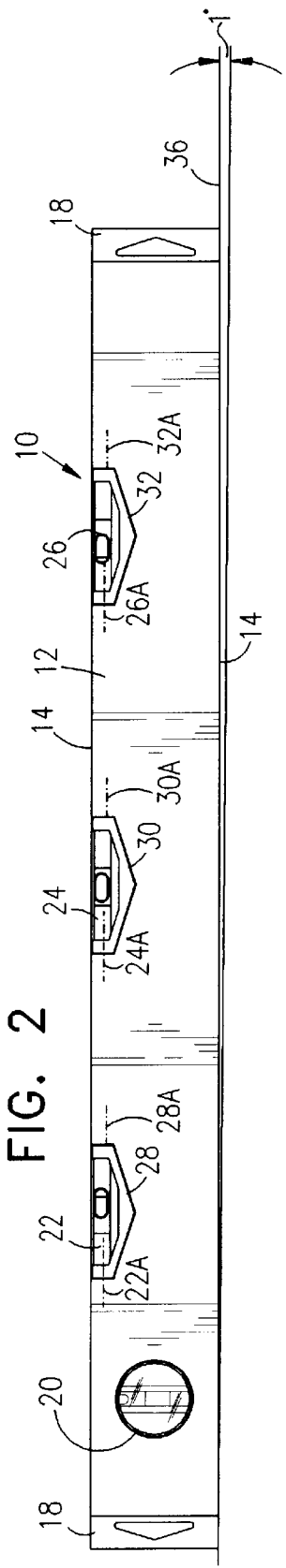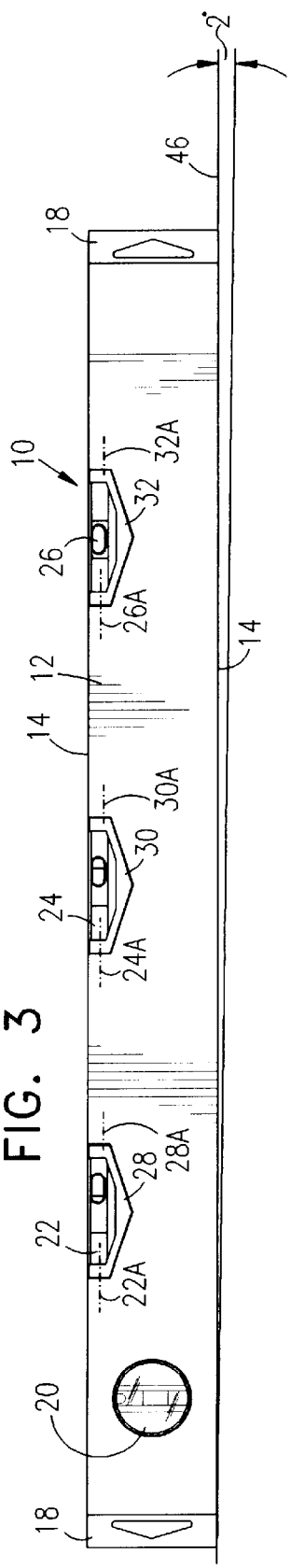

SPIRIT LEVEL WITH MULTIPLE BUBBLE VIALS

FIELD OF THE INVENTION

The present invention relates generally to spirit levels, and particularly to a spirit level with multiple bubble vials, each bubble vial having a different angular orientation, such that a range of angular orientations of surfaces may be set or plumbed.

BACKGROUND OF THE INVENTION

Spirit levels, also called bubble levels, are well known instruments used for setting horizontal or vertical surfaces. The level includes a sealed vial containing an air bubble floating in a liquid. The spirit level has a level face which is placed against the surface to set or plumbed. The particular surface is considered horizontal or vertical when the air bubble rests between predetermined graduated marks in the vial.

In general in the prior art, one single spirit level is dedicated to setting or plumbing a horizontal surface, a vertical surface and perhaps a surface tilted 45° from the vertical. In certain applications, however, it is important to obtain a slightly non-horizontal or non-vertical surface. For example, in setting drainage or sewage pipes, the pipe must be tilted a few degrees from the horizontal in order to ensure proper drainage. Prior art spirit levels are inadequate for setting such surfaces. The proper angle is usually set by rough estimation with a spirit level meant for setting horizontal surfaces, or if accuracy is required, is set with specially made equipment.

SUMMARY OF THE INVENTION

The present invention seeks to provide an improved spirit level comprising multiple bubble vials. It is noted that throughout the specification and claims the term bubble vial refers to a vessel in which a liquid and bubble are contained, and this is to be distinguished from a bubble vial housing which refers to any type of structure used as an intermediary to mount the bubble vial in the body of the spirit level.

Each bubble vial has a different angular orientation, such that a range of angular orientations of surfaces may be set or plumbed with the same level face. For example, surfaces tilted 0°, 1° or 2° from the vertical/horizontal may be plumbed/set.

In a preferred embodiment of the present invention, the bubble vial housing of each bubble vial has substantially the same angular orientation with respect to the level face, despite the fact that each bubble vial has a different angular orientation with respect to the level face. "Angular orientation of the bubble vial/bubble vial housing" is herein defined as the angular orientation of a longitudinal axis of the bubble vial/bubble vial housing with respect to the level face. The term "longitudinal axis" applies to the axis along the longest dimension of non-circular bubble vials/bubble vial housings. This feature distinguishes the present invention from the spirit levels of the prior art wherein the 0° bubble vial and bubble vial housing have one angular orientation with respect to the single level face, which is different than the annular orientation for the 90° bubble vial and bubble vial housing, and so forth. In contrast, since the present invention is concerned with small angular ranges, each bubble vial housing maintains substantially the same angular orientation with respect to the level face, while each bubble vial has a different angular orientation with respect to the level face.

There is thus provided in accordance with a preferred embodiment of the present invention a spirit level including a body having a level face for setting a surface, and a plurality of bubble vials each mounted in a bubble vial housing, the bubble vial housings being mounted in the body, each the bubble vial having a longitudinal axis, called a vial axis, and each the bubble vial housing having a longitudinal axis, called a housing axis, wherein an angular orientation of the vial axis of one the bubble vials with respect to the level face is different than an angular orientation of the vial axis of another the bubble vial with respect to the level face, the difference in angular orientation being in the range of 0°–30°. Other possible ranges include 0°–20°, 0°–10°, 0°–5°, 0°–3°, 0°–2°, or 0°–1°, for example.

In accordance with a preferred embodiment of the present invention an angular orientation of the housing axes of all the bubble vial housings with respect to the level face is generally equal.

Further in accordance with a preferred embodiment of the present invention an angular orientation of the housing axes of all the bubble vial housings with respect to the level face is substantially equal.

Still further in accordance with a preferred embodiment of the present invention the bubble level housings are mounted generally parallel to the level face. Additionally in accordance with a preferred embodiment of the present invention the bubble level housings are mounted along the level face.

BRIEF DESCRIPTION OF THE DRAWINGS

The present invention will be understood and appreciated more fully from the following detailed description, taken in conjunction with the drawings in which:

FIGS. 1–3 are simplified pictorial illustrations of a spirit level, constructed and operative in accordance with a preferred embodiment of the present invention, being used to set surfaces tilted 0°, 1° or 2° from the horizontal.

DETAILED DESCRIPTION OF A PREFERRED EMBODIMENT

Reference is now made to FIG. 1 which illustrates a spirit level 10, constructed and operative in accordance with a preferred embodiment of the present invention. Spirit level preferably includes a body 12 having a level face 14 for setting a surface 16. Body 12 is preferably made of a mechanically stable and durable metal alloy, as is well known in the art. Level face 14 typically has highly accurate flatness and smoothness. End caps 18, typically made of plastic, may be fixed to ends of body 12, as is known in the art.

Spirit level 10 preferably includes one or more bubble vials 20 mounted in body 12 for setting a vertical surface and a plurality of bubble vials 22, 24 and 26 for setting non-vertical surfaces. Although three bubble vials are illustrated in the drawing, it is appreciated that any other number of bubble vials may be employed. Each bubble vial 22, 24 and 26 is mounted in a bubble vial housing 28, 30 and 32, respectively, which housings are mounted in body 12. The bubble vial housings 28, 30 and 32 are illustrated as non-circular, however, they may be generally circular as well.

In the illustrated embodiment, each bubble vial 22, 24 and 26 has a longitudinal axis, called a vial axis, designated by reference numerals t-2A, 24A and 26A, respectively. Similarly, each bubble vial housing 28, 30 and 32 has a longitudinal axis, called a housing axis, designated by reference numerals 28A, 30A and 32A, respectively. Axes 22A, 24A and 26A each have a different angular orientation with respect to level face 14. This can be seen by comparison of FIGS. 1–3. In FIG. 1, the surface 16 to be set is tilted 0° to the horizontal. Only the bubble of bubble vial 22 is between the markings; the bubble of bubble vial 24 is slightly to the left (in the sense of FIG. 1) and the bubble of bubble vial 26 is slightly more to the left than the bubble of bubble vial 24.

In FIG. 2, a surface 36 to be set is tilted 1° to the horizontal. Only the bubble of bubble vial 24 is now between the markings. Similarly, in FIG. 3, a surface 46 to be set is tilted 2° to the horizontal. Only the bubble of bubble vial 26 is now between the markings.

It will be appreciated by persons skilled in the art that the difference in angular orientation of the bubble vials of spirit level 10 may span a small range of angles, such as 0°–1° or a larger range, such as 0°–30°, depending on the particular application.

The bubble level housings may be mounted generally parallel to level face 14. In addition, the bubble level housing,s may be even mounted along level face 14 itself Such a structure is shown in FIGS. 1–3, wherein the level 10 is provided with two opposing level faces 14.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A spirit level comprising:

a body having a level face for setting a surface; and a plurality of bubble vials each mounted in a bubble vial housing, said bubble vial housings being mounted in said body, each said bubble vial having a longitudinal axis, called a vial axis, and each said bubble vial housing having a longitudinal axis, called a housing axis, wherein an angular orientation of the vial axis of one said bubble vials with respect to said level face is different than an angular orientation of the vial axis of another said bubble vial with respect to said level face, the difference in angular orientation being in the range of 0°–30°, wherein said bubble vials and said angular orientations of said vial axes are permanently and non-adjustably set in said body, and wherein each bubble vial has a bubble and a pair of graduation markings marked on said bubble vial, and wherein when the bubble of a first of said bubble vials is between its corresponding pair of graduation markings, the bubble of a second of said bubble vials is not between its corresponding pair of graduation markings but straddles one of its corresponding graduation markings.

2. The spirit level according to claim 1 wherein said range is 0°–20°.

3. The spirit level according to claim 1 wherein said range is 0°–10°.

4. The spirit level according to claim 1 wherein said range is 0°–5°.

5. The spirit level according to claim 1 wherein said range is 0°–3°.

6. The spirit level according to claim 1 wherein said range is 0°–2°.

7. The spirit level according to claim 1 wherein said range is 0°–1°.

8. The spirit level according to claim 1 wherein an angular orientation of the housing axes of all said bubble vial housings with respect to said level-face is generally equal.

9. The spirit level according to claim 1 wherein an angular orientation of the housing axes of all said bubble vial housings with respect to said level face is substantially equal.

10. The spirit level according to claim 1 wherein said bubble level housings are mounted generally parallel to said level face.

11. The spirit level according to claim 1 wherein said bubble level housings are mounted along said level face.

12. The spirit level according to claim 1 wherein said angular orientations of the vial axes of three of said bubble vials is greater than 0° and less than 30°.

13. The spirit level according to claim 1 wherein said angular orientations of the vial axes of three of said bubble vials is greater than 0° and less than 5°.

14. The spirit level according to claim 1 wherein said angular orientations of the vial axes of three of said bubble vials is greater than 0° and less than 3°.

15. A method for leveling a surface with a spirit level, comprising: providing a spirit level comprising a body having a level face for setting a surface, and a plurality of bubble vials each mounted in a bubble vial housing, said bubble vial housings being mounted in said body, each said bubble vial having a longitudinal axis, called a vial axis, and each said bubble vial having a bubble and a pair of graduation markings marked on said bubble vial, wherein an angular orientation of the vial axis of one said bubble vials with respect to said level face is different than an angular orientation of the vial axis of another said bubble vial with respect to said level face, the difference in angular orientation being in the range of 0°–30°, and wherein said bubble vials and said angular orientations of said vial axes are permanently and non-adjustably set in said body; and placing said spirit level against a first surface such that the bubble of a first of said bubble vials is between its corresponding pair of graduation markings, whereas the bubble of a second of said bubble vials is not between its corresponding pair of graduation markings but straddles one of its corresponding graduation markings, and placing said spirit level against a second surface such that the bubble of said second of said bubble vials is between its corresponding pair of graduation markings, whereas the bubble of said first of said bubble vials is not between its corresponding pair of graduation markings but straddles one of its corresponding graduation markings.

\* \* \* \* \*